United States Patent [19]

Cancio et al.

[11] 4,380,564

[45] * Apr. 19, 1983

[54] CROSS-TEARABLE DECORATIVE SHEET MATERIAL

[75] Inventors: Leopoldo V. Cancio; Pai-Chuan Wu, both of Cincinnati, Ohio

[73] Assignee: Clopay Corporation, Cincinnati, Ohio

[ * ] Notice: The portion of the term of this patent subsequent to Nov. 3, 1998, has been disclaimed.

[21] Appl. No.: 290,354

[22] Filed: Aug. 5, 1981

Related U.S. Application Data

[63] Continuation-in-part of Ser. No. 57,792, Jul. 16, 1979, Pat. No. 4,298,647.

[51] Int. Cl.³ .......................... B32B 3/30; B32B 27/20

[52] U.S. Cl. .................................... 428/167; 156/209; 156/244.11; 264/293; 427/207.1; 428/172; 428/323; 428/332; 428/343; 428/500; 428/511

[58] Field of Search ................. 428/43, 167, 172, 323, 428/332, 343, 500, 511, 137, 213, 215, 220; 427/207 R, 207.1; 264/284, 293; 156/244.11, 209, 244.15; 116/244.15

[56] References Cited

U.S. PATENT DOCUMENTS

| | | | |
|---|---|---|---|
| 3,379,814 | 4/1968 | Bracey, Jr. | 264/322 |
| 3,511,335 | 5/1970 | Uddenborg | 428/511 |
| 3,783,088 | 1/1974 | Yoshiyasu et al. | 428/323 |
| 4,135,023 | 1/1979 | Lloyd et al. | 428/343 |
| 4,139,669 | 2/1979 | Chang | 428/167 |
| 4,173,676 | 11/1979 | Asakura et al. | 428/343 |
| 4,298,647 | 11/1981 | Cancio et al. | 428/43 |

*Primary Examiner*—Paul J. Thibodeau
*Attorney, Agent, or Firm*—Wood, Herron & Evans

[57] ABSTRACT

A decorative plastic sheet material having intersecting tear lines formed in the surface of the sheet material whereby the material may be torn by hand in more than one direction. The decorative sheet material is composed of a polymeric material incorporating a dispersed phase. The sheet material is particularly suited for the manufacture of decorative surface coverings such as shelf liners and the like which require sizing of the material in both a lengthwise and widthwise direction to conform it to the dimensions of the surface being covered.

20 Claims, 2 Drawing Figures

CROSS-TEARABLE DECORATIVE SHEET MATERIAL

CROSS-REFERENCE TO RELATED APPLICATIONS

This application is a continuation-in-part of U.S. Ser. No. 57,792 filed July 16, 1979, now U.S. Pat. No. 4,298,647 and assigned to the assignee of this invention.

BACKGROUND OF THE INVENTION

This invention relates to a decorative plastic covering material and, more particularly, to a decorative covering of plastic sheet material having cross-tearable lines.

Plastic film or sheet material is used widely in the fabrication of many useful articles. Particular utility for plastic sheet material has been found in the area of surface coverings because of the characteristic of plastic material not to absorb moisture. Plastic coverings therefore do not lose strength, buckle or crack when exposed to water and are therefore long wearing and easy to keep clean. However, since the dimensions of the surface to be covered by the sheet material vary over a wide range, plastic coverings are sold in more or less standard sizes which must then be trimmed to conform to the dimensions of the surface being covered. This is usually done by the consumer's measuring the dimension of the surface to be covered and cutting the material in both a lengthwise and widthwise direction with a cutting tool, such as a knife or scissors, to conform the material to those dimensions. Such trimming operations are not only a nuisance to the consumer, but also it is difficult to achieve a smooth, straight edge after cutting as desired. In addition, measuring errors can ruin a sheet of covering material.

Therefore, there is a need for a decorative plastic covering material which permits easy sizing of the material in both a lengthwise and widthwise direction without the need for any cutting tools so that the sheet material may be quickly and easily sized by hand to conform to the surface which it is to cover. Thus, the sheet material must tear easily and cleanly in both directions with generally the same degree of tearing force. This sheet material must also have good tensile strength in both its lengthwise and widthwise direction to be able to withstand normal handling during both fabrication and use without unintentional tearing of the material. It must also retain its strength over a long period of time.

To this end, this invention provides a decorative plastic surface covering material which is tearable by hand in more than one direction, e.g., in both a lengthwise and widthwise direction. The material is provided with intersecting tear lines whereby the material may be torn by hand along chosen lines in both directions to thereby conform the material to the length and width of the surface being covered. It is of course recognized that plastic film or sheet material having intersecting channel-like lines has been made before. For example, U.S. Pat. No. 3,484,835, entitled "Embossed Plastic Film" and assigned to the assignee of this invention, discloses such a film. However, the material disclosed there cannot be sized by hand along the lines. Rather, when it is pulled in either direction, the plastic material does not tear easily. Such material therefore is incapable of providing a hand-tearable article permitting easy sizing along predetermined lines and resulting in smooth, straight edges after tearing.

SUMMARY OF THE INVENTION

This invention is predicated upon the discovery that a sheet of plastic material may be formed with cross-tear lines whereby the material may be cleanly torn by hand in more than one direction to size the plastic material to the surface to be covered, but without significant loss of tensile strength of the sheet as a whole in any direction. Particularly, it has been found that when a sheet of plastic film comprising a major portion of polymeric material and a minor portion of a dispersed phase is provided with a series of intersecting tear lines formed in the surface of the sheet material that the sheet material is relatively strong but easily and cleanly tearable by hand along the tear lines to provide a smooth, straight edge after tearing. The invention of this application is particularly directed to a decorative surface covering material and can include an adhesive applied to one side to permit securing of the decorative sheet material to the surface, if desired.

In accordance with this invention, a sheet of plastic material composed of a high percentage of polymeric material and a dispersed phase is provided with a first set of parallel tear lines spaced one from another and a second set of parallel tear lines spaced one from another such that two sets of tear lines intersect each other permitting sizing of the material in two directions. In a preferred form of the invention, the sheet is rectangular and one set of tear lines runs parallel to the long free edges of the sheet and the other set runs parallel to the short or widthwise free edges of the sheet, the two sets of lines intersecting perpendicularly.

One side of the sheet material may be provided with an adhesive such as a water-based adhesive or a pressure-sensitive adhesive covered by a suitable protective material which may be removed prior to sizing of the sheet material to expose the adhesive. The plastic sheet material is thus securable to the surface to be covered. The lengthwise and widthwise tear lines permit the material to be sized in two directions such that the covering material may be conformed to both the length and width of the surface being covered prior to being applied to the surface. The tearing along these lines results in sizing of the material to conform to the surface to be covered and smooth, straight edges after sizing.

The decorative surface covering material of this invention is made from suitable plastic materials, preferably of the thermoplastic polyolefin type and particularly polyethylene, polyproplylene, and copolymers and blends thereof. The polymeric material contains a dispersed phase which has been found to be very beneficial in providing good tearability characteristics along the tear lines, including the characteristic that the material may be torn in either direction with substantially the same tearing force. In a particularly preferred form of the invention, the polymeric component consists of about 85% low density polyethylene while the dispersed phase consists of about 15% calcium carbonate. This composition has been found to be particularly advantageous in that it provides good tear characteristics in both directions while maintaining good tensile strength in all directions without substantial loss of strength over time. The thickness of the sheet material can vary over a wide range, for example, from about 1 mil to about 10 mils. Moreover, the tear lines may be made according to a number of techniques including embossing of the surface. The advantages of this invention have been achieved by embossing tear lines in the range of 5 to 8 mils in width with a 50% to 60% reduction in sheet thickness in the embossed portion of the sheet.

The advantages and objects of this invention will be further appreciated by the following detailed description of the invention with reference to the accompanying drawing.

DETAILED DESCRIPTION OF THE INVENTION

Figure 1:
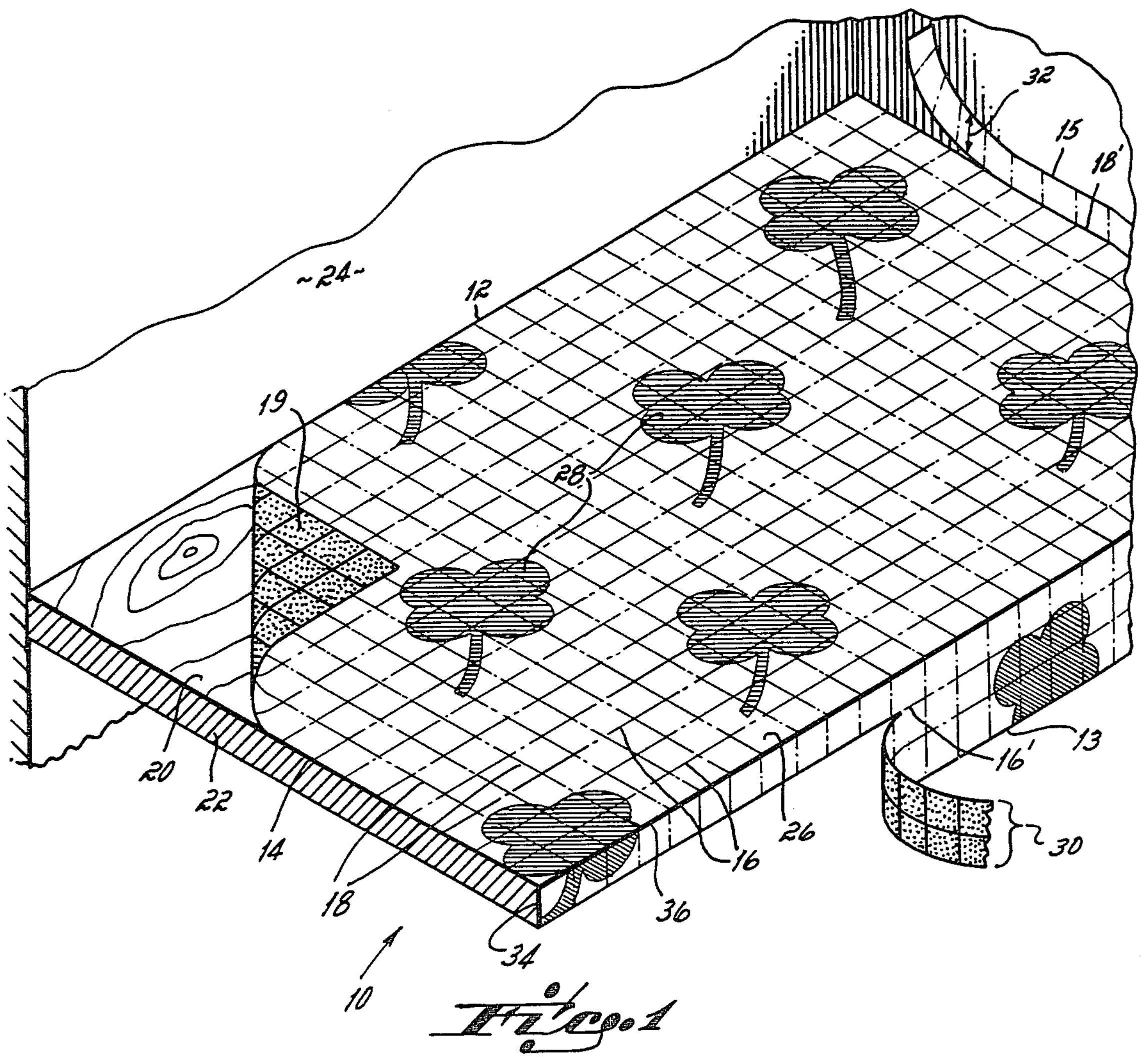
FIG. 1 is a pictorial view illustrating a decorative sheet of plastic covering material according to this invention and illustrating the sizing of the sheet material to conform to the dimensions of the surface being covered.

With reference to the drawings, the sheet material 10 of FIG. 1 depicts a suitable plastic sheet material such as thermoplastic polyolefin material of the polyethylene or polypropylene type. This material can have a thickness in the range of about 1 mil to about 10 mils, as desired, with about 5 to 6 mils being preferred. As shown, the sheet material has a pair of free lengthwise edges 12 and 13 and a pair of free widthwise edges 14 and 15. The lengthwise edges 12 and 13 are substantially parallel to one another as are the widthwise edges 14 and 15. A series of lengthwise hand tear lines 16 in the sheet material 10 extend substantially parallel to the free edges 12, 13 of the material. A series of substantially perpendicularly intersecting hand tear lines 18 in the sheet material 10 extend substantially parallel to the free edges 14, 15 of the material.

The intersecting tear lines 16, 18 are respectively spaced at regular intervals across the surface of the film. The lines may be spaced at any desired distance to give a desired degree of sizing. For example and without limitation, the lines may be formed at 1/16 inch, ⅛ inch or ¼ inch or greater intervals. Of course, the closer the lines are together the closer the sheet material can be sized to the surface to be covered. One side of the sheet material 10, i.e., the underside 19, can have an adhesive on the surface thereof, e.g., a pressure-sensitive adhesive or a water-based adhesive, permitting the material 10 to be secured by contact to the surface being covered, e.g., the top surface 20 of a shaft 22 mounted on an upright back wall 24. Such adhesives are known to the art. An example of a suitable adhesive is Resyn Seal 32-2066 sold by the National Adhesive Company. It may be diluted with water to apply at a rate of 3.5 to 4.0 pounds per ream. The opposite or top side 26 of the sheet 10 can be provided with a decorative pattern as at 28. If desired, the pattern may be chosen such that the hand tear lines blend in or form a part of the pattern.

As stated above, a particularly preferred composition consists of about 85% low density polyethylene and about 15% $CaCO_3$. One composition actually made which exhibited excellent tear characteristics in both directions, good tensile strength, and resistance to aging consisted of a mixture of 70% Dow 550, a low density (0.925) polyethylene sold by the Dow Chemical Company, with 30% of a 50-50 mixture of polyethylene and $CaCO_3$, the latter sold by Georgia Marble Co. under the name Wing-Dale-White. The average particle size of the $CaCO_3$ was 12 microns. Other materials such as pigments may be added to the composition.

The pattern of cross tear lines in the sheet material 10 is formed, for example, by embossing a plastic film with embossing rolls. A preferred technique for producing the embossed cross tear lines according to this invention employs a slot die extrusion method wherein the plastic material with its second phase constituent is heated to a temperature of about 400° F. and then introduced into the nip formed by the contact between a metal embossing roll engraved with a raised regular pattern of perpendicularly intersecting lines and a hard rubber roll. The metal roll under suitable pressure presses into the rubber roll to produce a thin sheet having the embossed design. The speed of the rolls is maintained to permit continuous embossing of the plastic sheet material with the design according to this invention. The embossing process, known as the slot cast process, is known to the art and the parameters thereof may be varied depending upon the plastic material used, the thickness of the sheet material, and the width and depth of the tear lines desired.

Figure 2:
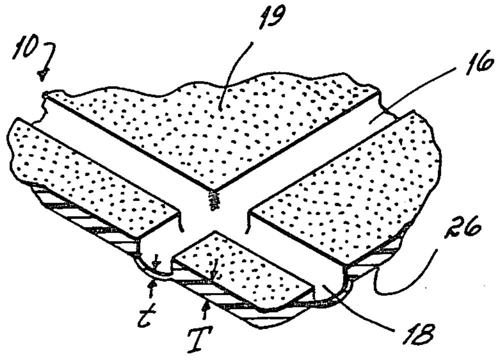
FIG. 2 is a greatly enlarged view of the underside of a portion of the sheet material for purposes of illustrating the form and dimensions of the tear lines.

Referring in addition to FIG. 2, the embossed sheet material produced according to the method just described includes a series of regular, spaced tear lines which protrude slightly above the underside surface 19 of the sheet material 10. For purposes of example only, in a sheet of plastic material having a thickness, T, of about 5 to 6 mils, tear lines 16 and 18 of about 5 to 8 mils in width are produced with the thickness, t, of material in the tear line being about 2½ to 3 mils. Thus, the reduction in sheet thickness produced by the embossing process is on the order of 50 to 60%. This reduction in thickness provides lines of weakness in the material along which the material may be torn by hand. As stated above, the cross-tear pattern in combination with the composition of the sheet material provides the material with the desirable properties of this invention.

The cross-tearable decorative sheet material of this invention may be formed of a polymeric material, as described above, wherein the dispersed phase is another polymeric material which by virtue of its viscoelastic behavior or thermal behavior forms a second phase when dispersed in the matrix. An example of such a composition is the following formulation: 50–70 parts by weight low density polyethylene, 40–20 parts by weight polypropylene, and 10 parts by weight PETG. The PETG polymer in this formulation functions as the dispersed phase. PETG is a high melting point, high viscosity polymer. It is a polyester copolymer of terephthalic acid, ethylene glycol and cyclohexane dimethanol and is available commercially from the Eastman Chemical Company.

The present invention also admits of a number of variations all within the scope thereof. For example, it is possible to co-extrude the preferred polymer material with a sheet of other material. One possibility is to form a sheet of cross-tearable decorative material 6 mils in thickness by co-extrusion of 4 mils of the preferred composition set forth above and 2 mils of high density polyethylene. The co-extruded film may then be embossed or otherwise treated to form the desired tear lines. Another possibility is to extrusion coat the preferred polymeric film material on paper, scrim or other substrate. A suitable combination is the Dow 550-calcium carbonate composition described above which is extrusion coated on a paper substrate which has been bleached and left 3 mils in thickness. The two-layer laminate is then embossed with the cross-tear line.

The co-extrusion techniques just described may be employed to lower the cost of the film where the second phase is less expensive than the preferred composition or to provide a surface that may print better for receiving a decorative surface design or which may receive an adhesive better. For example, foamed polyethylene prints better than the low density polyethylene-calcium carbonate composition. Thus, by co-extruding the two, a better printing surface is provided without detracting from the other highly desirable properties of the sheet material.

The tear lines 16 and 18 also can be formed by other methods such as scoring or compression molding. The tear lines also can be formed in the nip created by a metal embossing roll and a metal, instead of rubber, roll. This method is desirable where the upperside 26 is to be printed upon since a raised surface might interfere with some printing operations.

In addition, it has been found that plastic sheet material made by the slot cast process is often somewhat easier to tear in its machine direction, i.e., the direction along which the material is made than in a direction transverse thereto. Thus, an embossing roll can be designed to compensate for this effect by having a more pronounced embossing depth in the transverse direction than in the machine direction to compensate for this difference.

The advantages of this invention may be readily appreciated by observing the ease with which a sheet of plastic material made according to this invention may be sized to conform to the dimensions of the surface which it is to cover. Referring again to FIG. 1, the sheet material 10 which is originally oversized with respect to the surface 20 of the shelf 22 being covered is first laid on the shelf. Excess widths of sheet material extend over both the lengthwise and widthwise edges of the shelf as at 30 and 32, respectively. To size the material in the lengthwise direction, the consumer simply grasps the excess sheet material 30 at the hand tear line 16' closest to the edge of the shelf 22 and pulls to separate it from the remainder of the sheet 10. The plastic sheet material tears easily and cleanly along the line 16' until it reaches the intersecting free edge 15. This operation is repeated for the excess width 32 running in the widthwise direction of the shelf 22, the consumer again grasping the excess width 32 and tearing along the line 18' nearest the edge of the shelf to separate it from the remainder of the sheet 10. It will be recognized that the consumer if desired can fold the sheet material 10 over a forward edge 34 of the shelf 22 to thereby cover it (as illustrated) or may simply tear off the excess material at the upper edge 36 of the surface 20.

The adhesive on the underside surface 19 may be activated either before or after sizing. That is, in the case of a pressure-sensitive adhesive, the protective covering may be removed to expose the adhesive after which the sheet material is secured to the shelf surface. The excess material extending over the edge which does not contact the shelf surface is then hand stripped in both a lengthwise and widthwise direction as above described. In the case of a water-based adhesive, the sheet could first be sized as described, the adhesive moistened for tack, and the now sized material secured to the shelf. In either event, it will be recognized that the combination of the composition of the sheet material and the intersecting or cross-tear lines of reduced cross-sectional thickness permit the material to be sized quickly and easily by the consumer without the need for any cutting tools.

Although this invention has been described in terms of certain preferred embodiments, it will be appreciated by those skilled in the art that other forms may be adopted within the scope of the invention.

We claim:

1. A method of producing a plastic film which may be torn by hand along one or more hand-tear lines without the use of cutting tools comprising the steps of:

providing a polymeric material, introducing into said polymeric material a material forming a dispersed second phase in a matrix of said polymeric material, forming said polymeric material containing said dispersed second phase into a film, and embossing said film to form one or more substantially continuous, imperforate hand-tear lines of reduced film thickness therein, said material forming said dispersed second phase being present in said film in an amount effective to initiate and propagate tear along said hand-tear lines by hand-tearing without the use of cutting tools.

2. The method of claim 1 wherein said film is formed of a polymeric material chosen from the group consisting of polyolefins, copolymers of polyolefins and blends thereof.

3. The method of claim 1 wherein said material forming said dispersed phase is calcium carbonate.

4. The method of claim 1 wherein said polymeric material is low density polyethylene and said material forming said dispersed phase is calcium carbonate.

5. The method of claim 1 wherein said film is composed of about 85% by weight low density polyethylene and about 15% by weight calcium carbonate.

6. The method of claim 1 wherein said material forming said dispersed phase is a polyester copolymer of terephthalic acid, ethylene glycol and cyclohexane dimethanol.

7. The method of claim 1 further comprising applying an adhesive to one side of said film.

8. The method of claim 1 wherein said polymeric film is co-extruded with another polymer.

9. The method of claim 1 wherein said polymeric film is laminated to another sheet material.

10. The method of claim 9 wherein said lamination is achieved by extrusion coating.

11. The method of claim 9 wherein said another sheet material is paper.

12. The method of claim 1 wherein said film is formed and embossed by a melt-embossing process.

13. The method of claim 1 wherein said film is embossed with a pattern of intersecting hand-tear lines and wherein said film may be torn in at least two directions by hand with generally the same degree of tearing force.

14. A hand-tearable plastic film which may be torn by hand along one or more hand-tear lines without the use of cutting tools comprising an embossed polymeric film having one or more substantially continuous imperforate hand-tear lines of reduced film thickness, said film being formed of a polymeric matrix containing a dispersed second phase in an amount effective to initiate and propagate tear along said hand-tear lines such that said film may be torn by hand without the use of cutting tools.

15. The hand-tearable plastic film of claim 14 wherein said film is a melt-embossed film of from about 1 to 10 mils in thickness.

16. The hand-tearable plastic film of claim 14 wherein said dispersed second phase is calcium carbonate in an amount of at least about 15% by weight.

17. The hand-tearable plastic film of claim 16 wherein the calcium carbonate has an average particle size of about 12 microns.

18. The hand-tearable plastic film of claim 14 wherein said polymeric matrix chosen from the group consisting of polyolefins, copolymers of polyolefins and blends thereof.

19. The hand-tearable plastic film of claim 14 wherein said polymeric matrix is formed of low density polyethylene with calcium carbonate dispersed therein as said second phase.

20. The hand-tearable plastic film of claim 14 wherein said film has substantially parallel free lengthwise edges extending in the machine direction of said film and a widthwise direction perpendicular thereto and wherein said hand-tear lines extend in said widthwise direction from lengthwise edge to lengthwise end.

* * * * *

UNITED STATES PATENT AND TRADEMARK OFFICE

CERTIFICATE OF CORRECTION

PATENT NO. : 4,380,564

DATED : April 19, 1983

INVENTOR(S) : Leopoldo V. Cancio et al

It is certified that error appears in the above-identified patent and that said Letters Patent is hereby corrected as shown below:

In column 3, line 50, "shaft" should be --shelf--.

In column 3, line 53, "32-2066" should be --33-2066--.

Signed and Sealed this

*Twenty-eighth* Day of *June 1983*

[SEAL]

*Attest:*

GERALD J. MOSSINGHOFF

*Attesting Officer* *Commissioner of Patents and Trademarks*